Aug. 17, 1926.　　　　　　　　　　　　　　　1,596,749
S. A. McKITTRICK
METHOD AND APPARATUS FOR FLATTENING GLASS
Filed Oct. 10, 1925

Inventor
Samuel A. McKittrick
Kwis Hudson & Kent
Attys.

Patented Aug. 17, 1926.

1,596,749

UNITED STATES PATENT OFFICE.

SAMUEL A. McKITTRICK, OF SANDUSKY, OHIO.

METHOD AND APPARATUS FOR FLATTENING GLASS.

Application filed October 10, 1925. Serial No. 61,685.

The present invention relates to improvements in methods and apparatus for flattening curved shawls of glass either hand-blown or machine-blown, and has for its object to produce flattened shawls or sheets of glass which are as near perfectly flat as it is possible to get them.

The usual method of flattening such shawls of glass has been to place them upon flat stones supported within a furnace on a carrier which is so mounted that the stone can be moved at intervals to different points within the furnace. The shawls are placed upon the stone while it is positioned at a point within the furnace where the temperature is sufficiently high to soften the glass and cause it to flatten out on the stone. The carrier is then moved to shift the stone to a point where the temperature is lower to permit the glass to cool and harden upon the stone. In this method, as heretofore practiced, the glass sheets produced have not been uniformly and perfectly flat. The main reason for these imperfections was that the flattening stones had been so supported on the carrier that they were not uniformly heated throughout which has resulted in the distortion of the top surface of the stones by reason of unequal expansion, and this distortion of the surface of the stone causes a corresponding bow in the glass. By the method of the present invention the flattening stone is uniformly heated throughout so that its upper surface is not distorted which results in a much more perfect product.

It has been found, however, that the sheets have a tendency to bulge slightly at the center in cooling due to the fact that all portions of the sheet do not give off heat at the same rate and the contraction is not uniform throughout the entire sheet. The present invention has for an object to provide a method and apparatus by which the glass sheets are cooled upon the flattening stones in such manner that the sheets are caused to cool more uniformly and the slight bowing of the sheets due to the unequal contraction thereof, is eliminated.

With the above objects in view the invention may be said to comprise the method and apparatus as illustrated in the accompanying drawings hereinafter described and particularly set forth in the appended claims together with such variations and modifications thereof as will be apparent to one skilled in the art to which the invention appertains.

Figure 1:
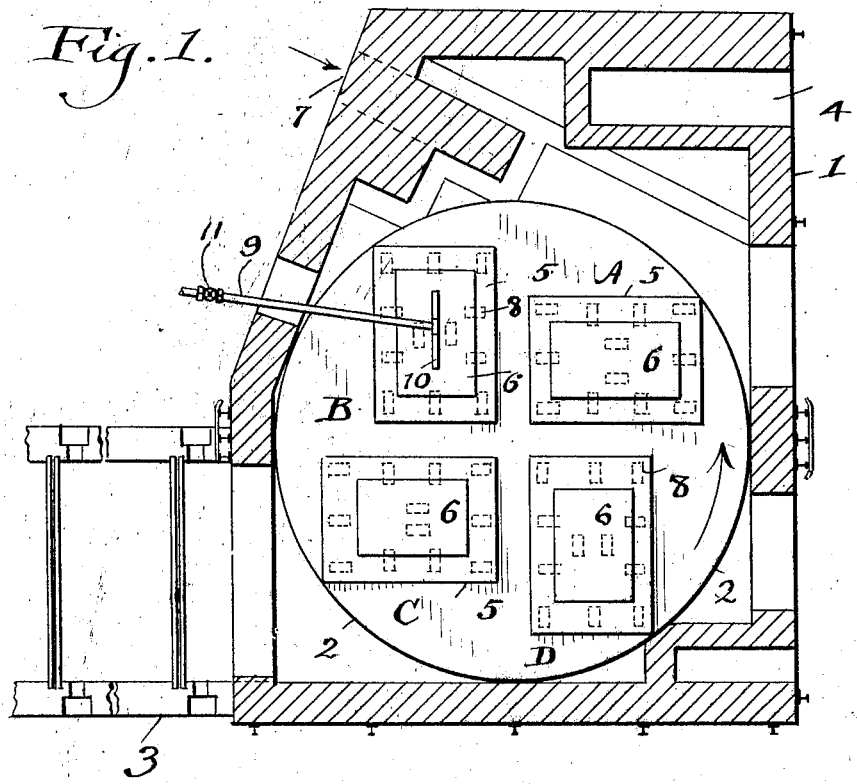
Figure 2:
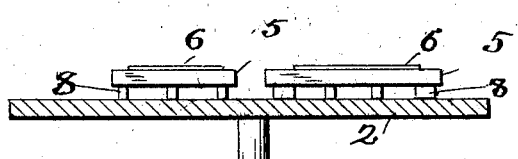
Figure 3:
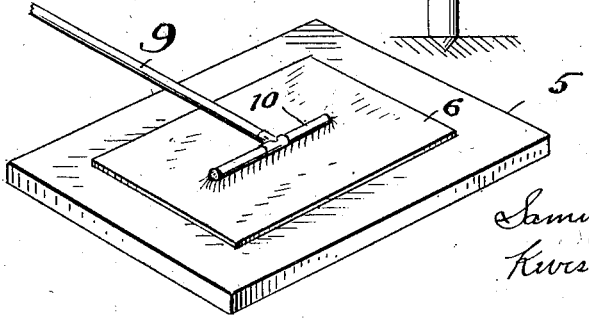

Reference should be had to the accompanying drawings forming a part of the specification in which Fig. 1 is a sectional plan view more or less diagrammatically representing a glass flattening furnace with a leer leading therefrom; Fig. 2 is a view showing the flattening table in vertical section; Fig. 3 is a perspective view showing a flattening stone with the glass sheet thereon positioned beneath the air-jet nozzle.

In accordance with the method of the present invention, flattening stones are supported on a movable carrier within the furnace in such a manner that the under surface of the stone as well as the top surface is exposed to the heating medium within the furnace so that the stones are uniformly heated throughout and there will be no distortion of the flat top surface thereof by reason of unequal expansion and contraction. Portions of the furnace are heated to a higher temperature than others and the carrier upon which the stones are mounted moved at intervals to shift the stones into and out of the hotter portion of the furnace. Each glass shawl to be flattened is placed upon a stone while the stone is in the portion of the furnace maintained at a high temperature, the temperature at this point being such that the glass if softened and caused to be flattened upon the surface of the stone. The carrier is then moved to carry the stone with the flattening shawl thereon to a point where the temperature is lower to permit the glass to cool and harden upon the flattening stone. In order to overcome the tendency of the glass sheet to bulge slightly in the center, which may be due to a more rapid cooling of the under surface of the sheet which is in contact with the flattening stone than the upper surface thereof, the upper surface of the sheets of glass are subjected to the action of a gaseous cooling medium which is directed upon the top surface of the sheets, compensating for the more rapid cooling of the bottom surface thereof so that the sheet remains flat upon the stone while cooling.

Referring to the drawings, a glass flattening furnace which may be of the usual construction is indicated by the numeral 1 and has located upon the interior thereof a flattening table 2, the furnace being connected with the usual leer structure 3. Heat is introduced into the furnace in any desired manner at the point indicated at 4 in Fig. 1. A number of flattening stones, in this instance four, are mounted upon the table 2 and the movement of the table is such that each stone is positioned successively at the points indicated by the letters A, B, C and D in Fig. 1 of the drawings. The temperature of the point A is higher than at the points B, C and D, and the glass shawls 6 are introduced through a passage 7 and placed upon the stones 5 at the point A where the temperature is such that the glass is softened and the shawls are flattened upon the stones. The table 2 is turned through a quarter revolution at intervals such that the shawls will be permitted to be flattened on the stones at the point A and to cool and harden while the stones occupy the positions B, C and D.

It has heretofore been the practice to place the flattening stones upon the flattening wheel or table and then to brick up around the edges of the stones until the stones are encased in brick work. This brick work extends up along the edges of the flattening stones to within an inch or two of the top. It has been found that the top surface of the stones mounted upon the flattening table in the manner above described become more or less curved or bowed on the top surface which is undoubtedly due to the fact that the flattening stones are not uniformly heated. The heat which impinges upon the flattening stones heats the upper surfaces thereof to a much greater extent that any other portion of the stone and consequently the heat will cause the top of the stone to expand more than the lower part of the stone and this will give the upper surfaces of the stones a curved or bowed shape. Naturally the glass shawls which are flattened against the stone having a curve or bow in it will have the same curve or bow after the glass is flattened against the stone and this curve or bow will persist in the glass even after the glass is sent through the leer.

In the present invention the flattening stones 5 are so mounted upon the flattening wheel 2 that the stones are elevated above the flattening wheel and have the major portion of the bottom surface exposed to the heat of the furnace. As shown herein the stones 5 are supported upon spaced supporting blocks 8, a sufficient number of which are provided to adequately support the stone and yet leave a sufficient space below the stone for the heated gases to circulate, the height of the flattening stone above the table being sufficient to permit the ready circulation of hot gases beneath the stone.

By reason of the construction above described the stones will be heated by the circulation of the heated gases beneath the same as well as by the heated gases impinged upon the top surfaces thereof, and the heating effect on the stones will be approximately uniform so that the stones will expand or contract in a uniform manner. Therefore, if under such conditions a flattening stone has been given a satisfactory flat surface for insertion in the furnace, the top of the stone will remain flat due to the fact that the equal heating will produce equal expansion and contraction throughout the body of the stone.

While the flattening stones may be kept flat by the means above described, the sheets would nevertheless be liable to become slightly distorted in cooling due to ununiform contraction caused by the more rapid cooling of the bottom surface of the sheets, and the present invention aims to provide means for insuring uniform cooling of the sheets of glass upon the stones so that the glass sheets will cool and harden upon the stones with all portions thereof remaining in contact with the flattening surfaces of the stones.

To this end means is provided for causing currents of air cooler than the air within the furnace to impinge upon the top surface of the glass sheet while it is in one of the cooling positions within the furnace. As shown herein the cooling air is introduced through an air pipe 9 which communicates with a suitable source of air under pressure and extends through a wall of the furnace. Within the furnace the pipe 9 is provided with a T-shaped discharge head 10 which is provided with numerous small openings for the escape of air on the under side thereof and which is so positioned in the furnace that it is directly over the central portion of a glass plate or sheet when the flattening stone on which the sheet is placed is in one of the cooling positions. As shown herein the nozzle or head 10 is positioned over the sheet carried by the flattening stone which is in the position B. The flow of air through the pipe 9 may be regulated by means of a suitable valve 11 to deliver the cooling air jets at a rate suitable for the desired cooling effect.

Having described my invention, what I claim is:

1. The method of flattening curved shawls of glass which comprises placing a shawl upon a flattening stone in a portion of a flattening furnace where the heat is sufficient to cause the glass to soften and flatten out on the stone, shifting said stone with the flattened glass sheet thereon to a point where the temperature is lower, and applying a cooling medium to the top surface of said sheet.

2. The method of flattening curved shawls of glass which comprises placing a shawl upon a flattening stone within a flattening furnace, applying heat to said stone to a substantially equal degree upon the top and bottom thereof to cause the glass to soften and flatten out on the stone, shifting the stone to a point in the furnace where the temperature is lower, and applying a cooling medium to the top surface of the sheet of glass.

3. The method of flattening curved shawls of glass which comprises placing a shawl upon a flattening stone within a flattening furnace, applying heat to said stone to a substantially equal degree upon the top and bottom thereof to cause the glass to soften and flatten out on the stone, shifting the stone to a point in the furnace where the temperature is lower, and directing a gaseous cooling medium upon the top surface of the glass sheet.

4. A flattening furnace comprising an enclosing casing, a carrier within the casing, a flattening stone supported on the carrier and movable to different positions in the furnace, and means associated with the furnace for directing a cooling medium upon a glass sheet resting on said stone.

5. A flattening furnace comprising an enclosing casing, a rotary carrier within the casing, a flattening stone supported on the carrier and movable to different portions of the furnace, and means associated with the furnace for directing a gaseous cooling medium upon a sheet of glass on said stone in one position thereof in the furnace.

In testimony whereof, I hereunto affix my signature.

SAMUEL A. McKITTRICK.